(12) United States Patent
Vydrzal

(10) Patent No.: US 11,305,850 B1
(45) Date of Patent: Apr. 19, 2022

(54) MARINE FRONT LIGHT APPARATUS

(71) Applicant: Billy Vydrzal, Smithville, TX (US)

(72) Inventor: Billy Vydrzal, Smithville, TX (US)

( * ) Notice: Subject to any disclaimer, the term of this patent is extended or adjusted under 35 U.S.C. 154(b) by 0 days.

(21) Appl. No.: 17/224,510

(22) Filed: Apr. 7, 2021

(51) Int. Cl.
| | |
|---|---|
| *B63B 45/02* | (2006.01) |
| *B60Q 1/04* | (2006.01) |
| *B60Q 1/24* | (2006.01) |
| *B63B 45/04* | (2006.01) |
| *F21V 21/116* | (2006.01) |

(52) U.S. Cl.
CPC ............ *B63B 45/02* (2013.01); *B60Q 1/0483* (2013.01); *B60Q 1/24* (2013.01); *B63B 45/04* (2013.01); *F21V 21/116* (2013.01)

(58) Field of Classification Search
CPC .................................. B63B 45/02; B63B 45/04
See application file for complete search history.

(56) References Cited

U.S. PATENT DOCUMENTS

| | | | | |
|---|---|---|---|---|
| 4,423,472 | A | | 12/1983 | Duthu |
| 5,339,225 | A | * | 8/1994 | Wiggerman ............... F21V 5/00 362/477 |
| 5,544,022 | A | | 8/1996 | Blackard |
| 5,711,591 | A | * | 1/1998 | Jordan .................. B60Q 1/2657 362/229 |
| 5,882,109 | A | | 3/1999 | McKinney |
| 6,174,078 | B1 | * | 1/2001 | Ohm ....................... B63B 45/04 114/343 |
| D455,853 | S | | 4/2002 | Henry |
| 6,848,815 | B1 | | 2/2005 | Born |
| 7,021,802 | B1 | | 4/2006 | Wyatt |
| 7,946,741 | B2 | * | 5/2011 | Nichols ................ B60Q 1/2657 362/477 |
| 8,277,098 | B2 | * | 10/2012 | Ortwein .................. B63B 45/04 362/477 |
| 9,171,436 | B1 | * | 10/2015 | Covelli .................... G08B 5/36 |
| 9,533,742 | B2 | | 1/2017 | Deven |
| 2004/0257822 | A1 | * | 12/2004 | Hopkins ................. B63B 45/02 362/477 |
| 2007/0279922 | A1 | * | 12/2007 | Villani .................... B63B 45/04 362/477 |
| 2015/0274267 | A1 | * | 10/2015 | Deven ................... F21V 31/005 362/477 |

* cited by examiner

*Primary Examiner* — Alexander K Garlen

(57) ABSTRACT

A marine front light apparatus for supplemental navigational visibility on front running lights includes a post having a post top end, a post bottom end, and a post sidewall. The post is selectively engageable with a running light mount of a boat. A running light housing is coupled to the post top end. A pair of running lights includes a red running light coupled to a running light housing sidewall and a green running light coupled adjacent the red running light. The pair of running lights has a plurality of connection leads in operational communication with the boat. A light housing is coupled to the post sidewall. A navigational light is coupled within the light housing and is in operational communication with the pair of running lights. A power switch is coupled to the running light housing and is in operational communication with the navigational light.

14 Claims, 8 Drawing Sheets

MARINE FRONT LIGHT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to marine light devices and more particularly pertains to a new marine light device for supplemental navigational visibility on front running lights. The present device includes a mounting post with a red/green running light as well as a navigational light. The navigational light may have a separate power switch to operate independently of the running light.

(2) Description of Related Art Including Information Disclosed Under 37 CFR 1.97 and 1.98

The prior art relates to marine light devices. Known devices include marine navigational lights with a variety of attachment mechanisms. Existing devices require separate wiring and mounting and lack integration with the existing mounted front red/green running lights. These devices typically include a single light for each mount rather than utilizing an extended mounting post to have multiple lights.

BRIEF SUMMARY OF THE INVENTION

An embodiment of the disclosure meets the needs presented above by generally comprising a post having a post top end, a post bottom end, and a post sidewall. The post is configured to be selectively engageable with a running light mount of a boat. A running light housing is coupled to the post. The running light housing has a running light housing bottom side coupled to the post top end, a running light housing top side, and a running light housing sidewall. A pair of running lights is coupled to the running light housing. The pair of running lights includes a red running light coupled to the running light housing sidewall and a green running light coupled adjacent the red running light. The pair of running lights has a plurality of connection leads configured to be in operational communication with the boat. A light housing is coupled to the post. The light housing is coupled to the post sidewall. A navigational light is coupled within the light housing. The navigational light is in operational communication with the pair of running lights. A power switch is coupled to the running light housing. The power switch is in operational communication with the navigational light.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
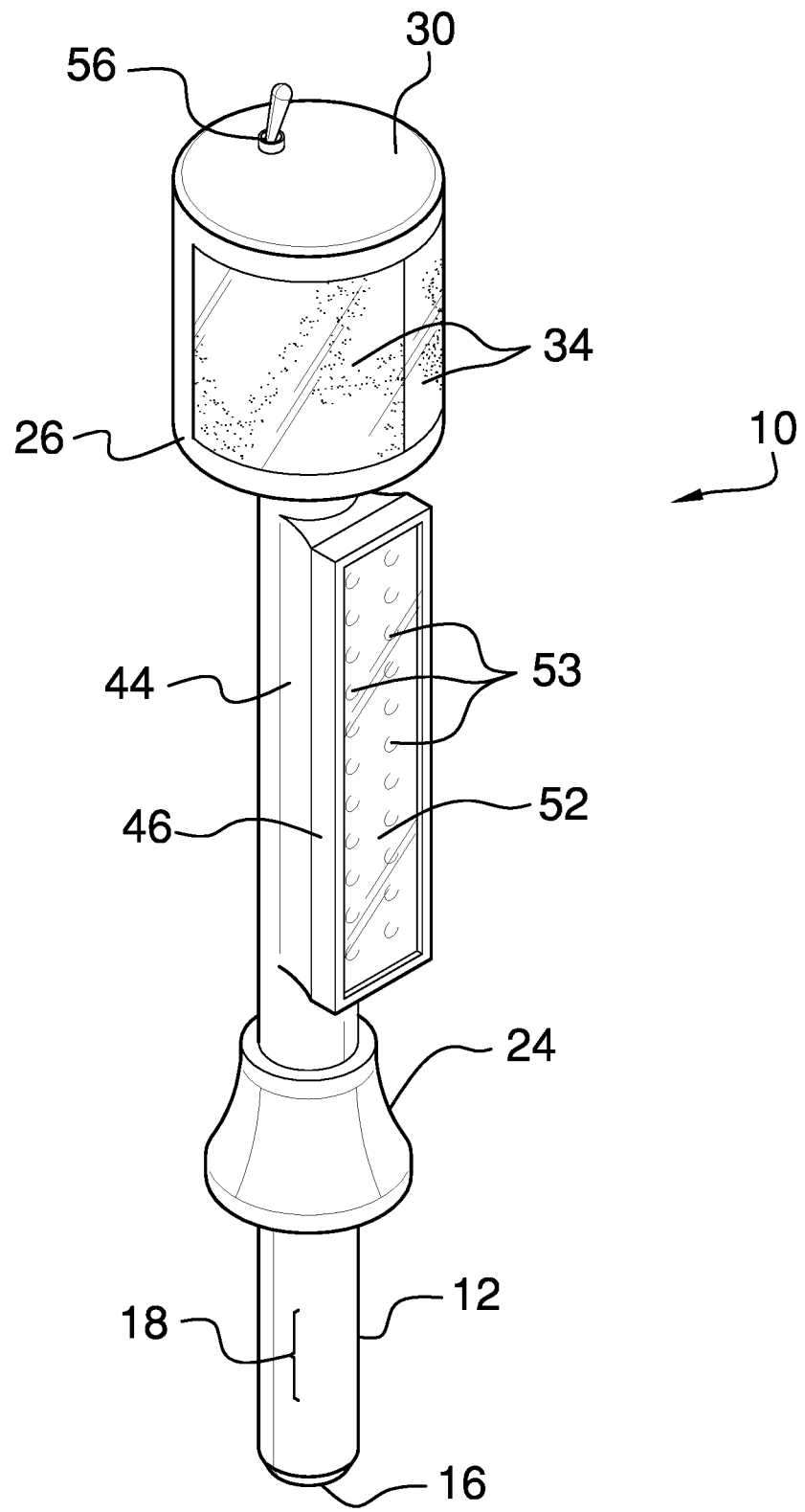
FIG. 1 is an isometric view of a marine front light apparatus according to an embodiment of the disclosure.
Figure 2:
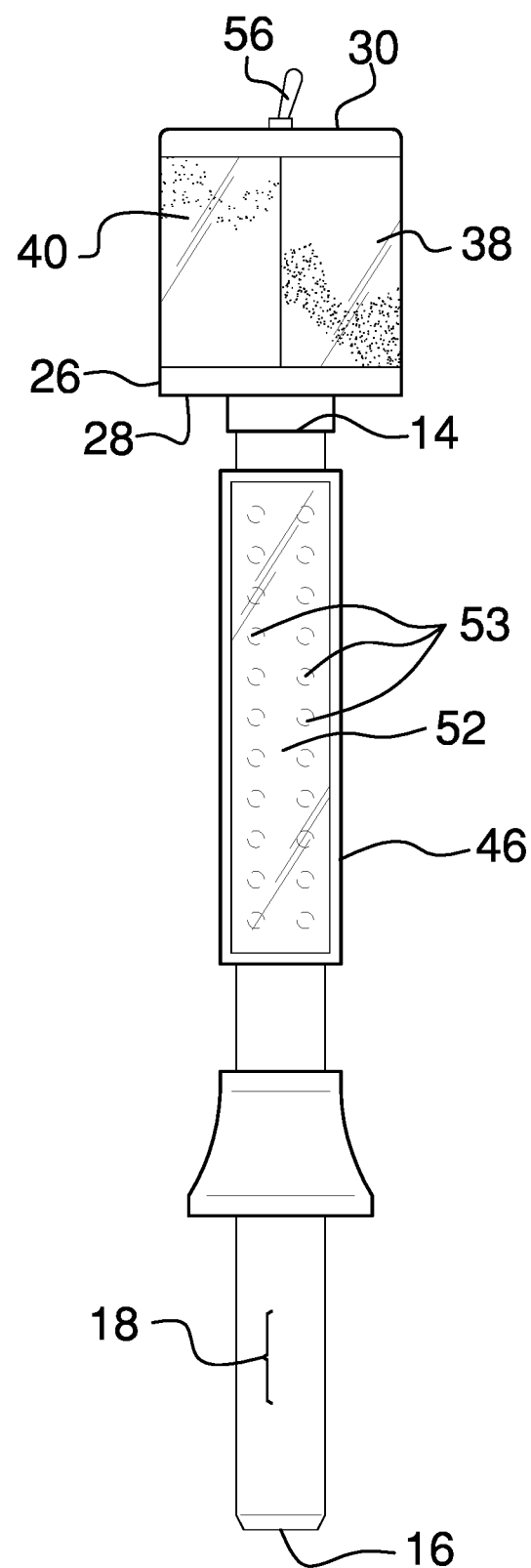
FIG. 2 is a front elevation view of an embodiment of the disclosure.
Figure 3:
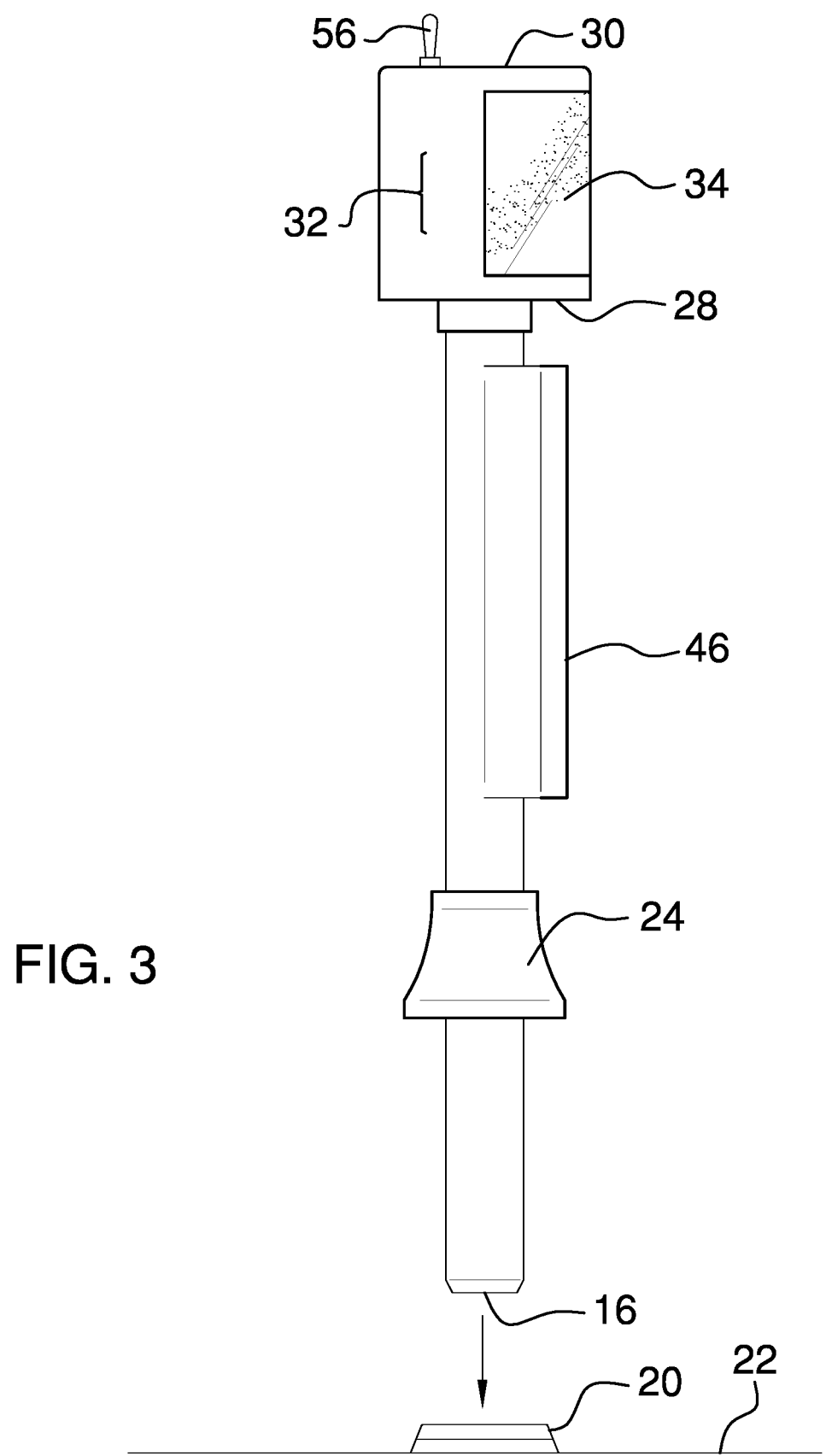
FIG. 3 is a side elevation view of an embodiment of the disclosure.
Figure 4:
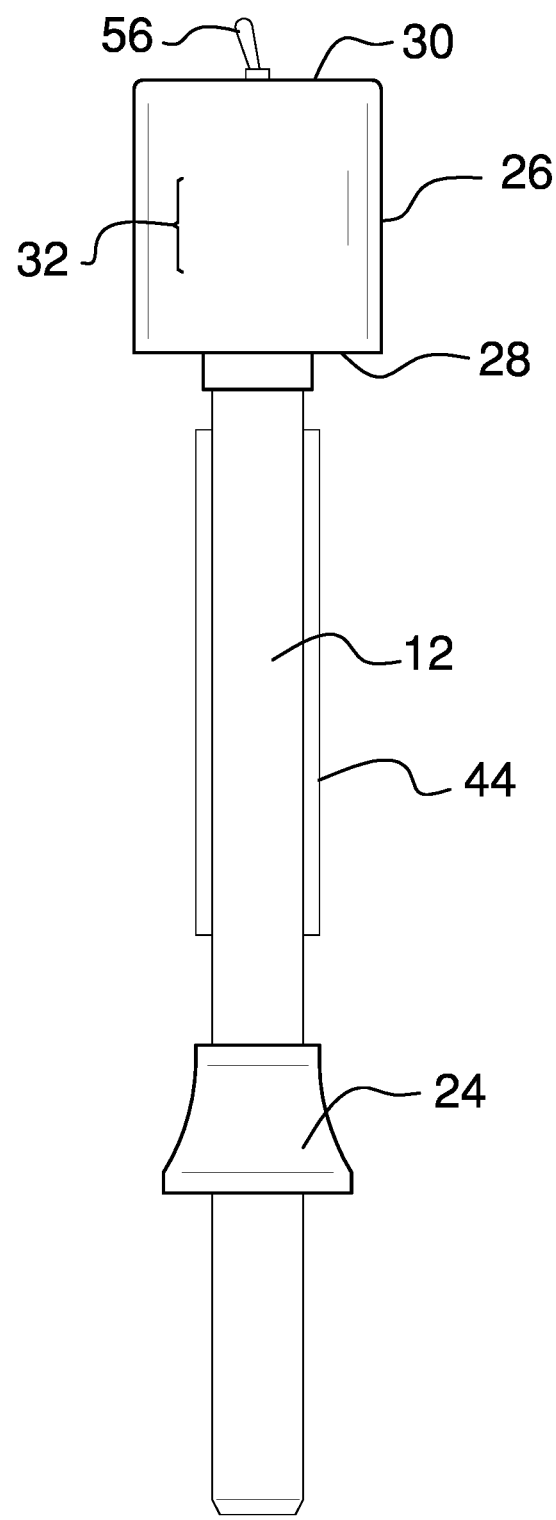
FIG. 4 is a rear elevation view of an embodiment of the disclosure.
Figure 5:
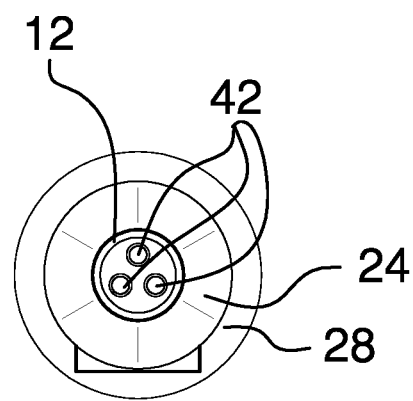
FIG. 5 is a bottom plan view of an embodiment of the disclosure.
Figure 6:
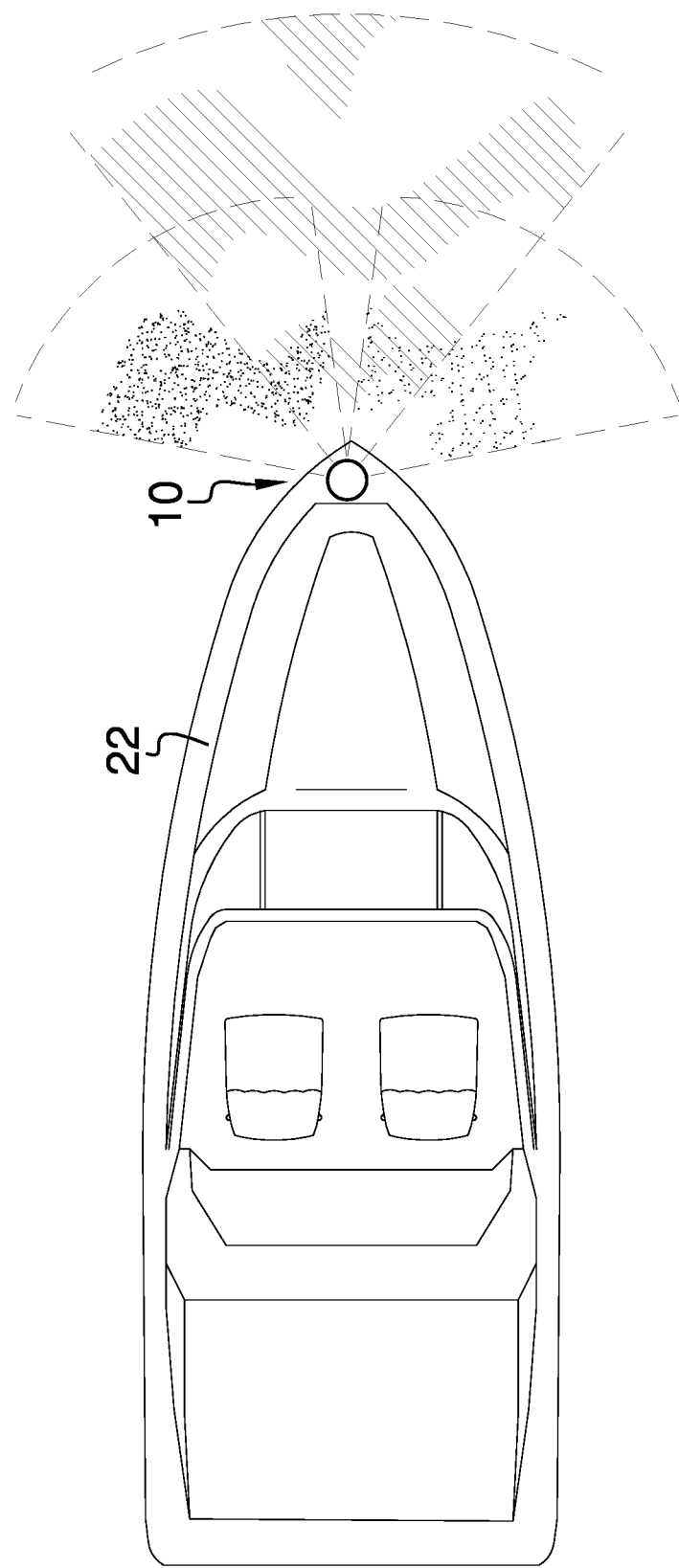
FIG. 6 is an in-use view of an embodiment of the disclosure.

With reference now to the drawings, and in particular to FIGS. 1 through 8 thereof, a new marine light device embodying the principles and concepts of an embodiment of the disclosure and generally designated by the reference numeral 10 will be described.

As best illustrated in FIGS. 1 through 8, the marine front light apparatus 10 generally comprises a post 12 having a post top end 14, a post bottom end 16, and a post sidewall 18. The post 12 is configured to be selectively engageable with a running light mount 20 of a boat 22. The post bottom end 16 may be chamfered to more easily entre to the running light mount 20. An attachment collar 24 may be coupled to the post 12. The attachment collar 24 is coupled to the post sidewall 18 and is selectively engageable with the running light mount 20. The attachment collar 24 may be flared.

A running light housing 26 is coupled to the post 12. The running light housing 26 has a running light housing bottom side 28 coupled to the post top end 14, a running light housing top side 30, and a running light housing sidewall 32. The running light housing 26 may be cylindrical.

A pair of running lights 34 is coupled to the running light housing 26. The pair of running lights 34 includes a red running light 38 coupled to the running light housing sidewall 32 and a green running light 40 coupled adjacent the red running light 38. The pair of running lights 34 may extend 180° around the running light housing sidewall 32. The pair of running lights 34 has a plurality of connection leads 42. The plurality of connection leads 42 is configured to be in operational communication with the boat 22 for power and control.

Figure 7:
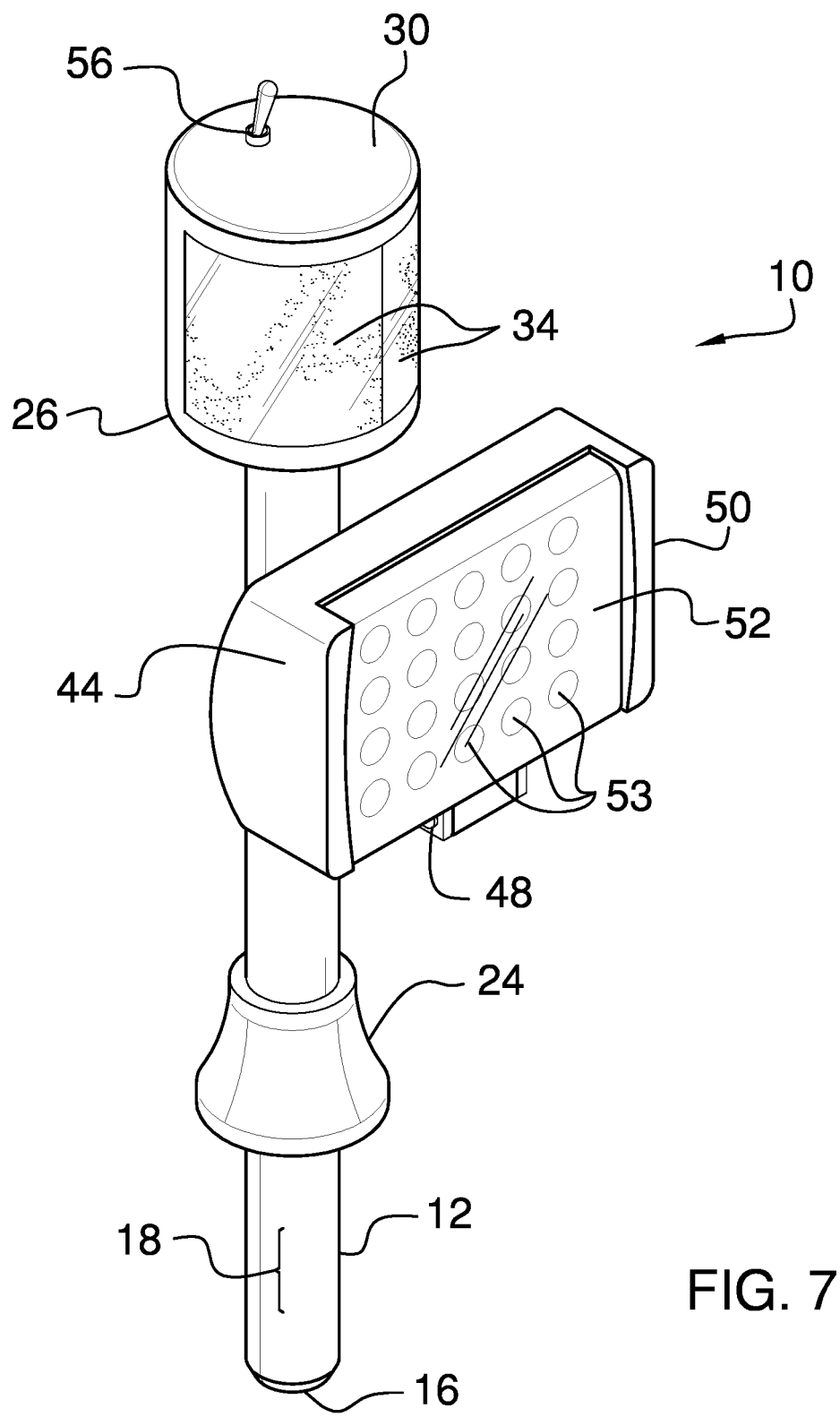
FIG. 7 is an isometric view of an embodiment of the disclosure.
Figure 8:
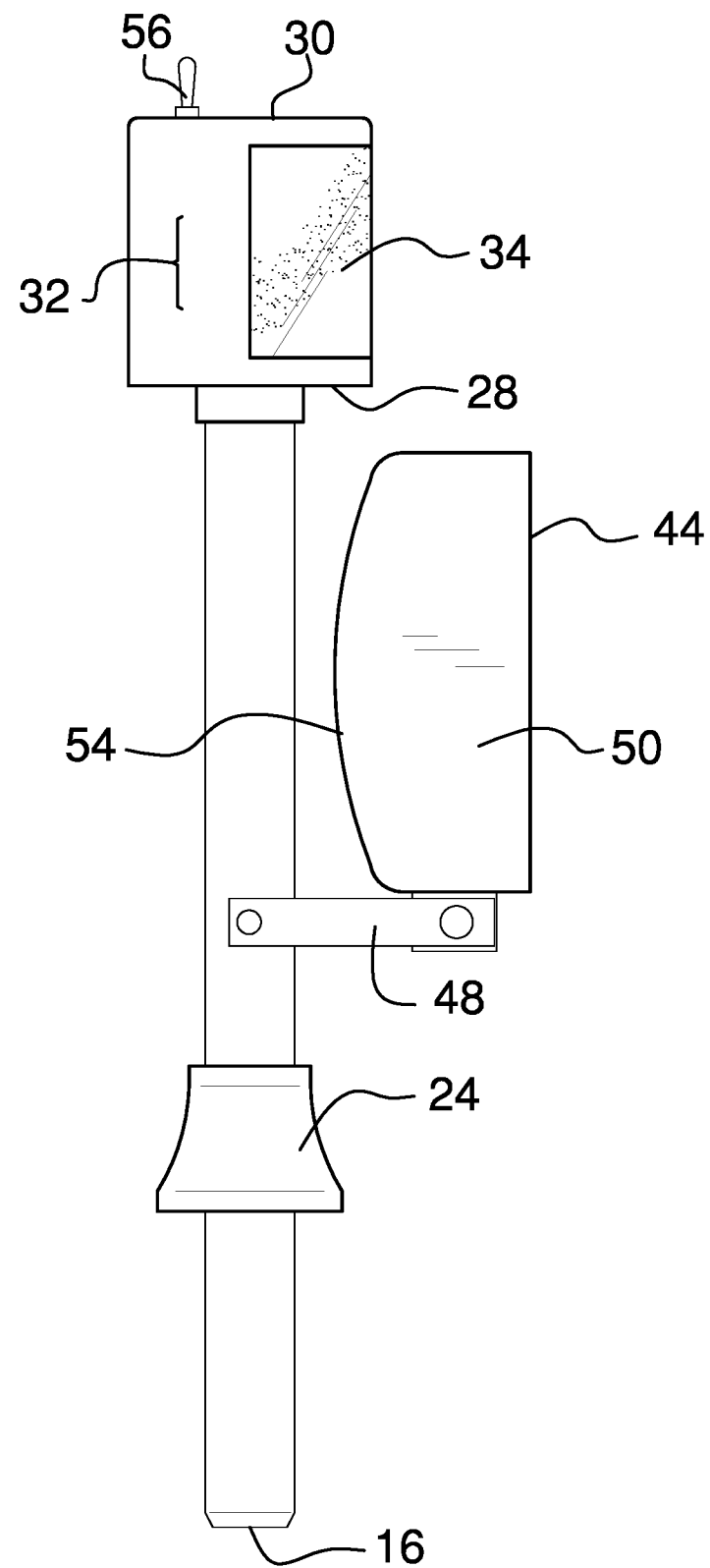
FIG. 8 is a side elevation view of an embodiment of the disclosure.

A light housing 44 is coupled to the post 12. The light housing 44 is coupled to the post sidewall 18. The light housing 44 may extend directly from the post sidewall 18 and may have a vertically oriented rectangular frame portion 46 as shown in FIGS. 1-5. The light housing may alternatively have a bracket portion 48 coupled to the post sidewall 18 and a head portion 50 coupled to the bracket portion 48 as shown in FIGS. 7 and 8. The head portion 50 may be rectangular and oriented horizontally and may be pivotable on the bracket portion 48.

A navigational light 52 is coupled within the light housing 44. The navigational light 52 is in operational communication with the pair of running lights 34 to receive power and may include a plurality of light emitting diodes (LEDs) 53. The head portion 50 of the light housing may have a rounded head back side 54 to accommodate a larger navigational light 52. A power switch 56 is coupled to the running light housing 26. The power switch 56 is coupled to the running light housing top side 30. The power switch 56 is in operational communication with the navigational light 52 to provide independent control even when the boat 22 is powering the pair of running lights 34.

In use, the plurality of connection leads 42 is put in operational communication with the boat 22 and the post 12 is inserted in the running light mount 20. The pair of running lights 34 are then used normally and when desired the power switch 56 is activated to turn on the navigational light 52 for improved visibility in low-light or nighttime boating.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A marine front light apparatus comprising:
   a post having a post top end, a post bottom end, and a post sidewall, the post being configured to be selectively engageable with a running light mount of a boat;
   a running light housing coupled to the post, the running light housing having a running light housing bottom side coupled to the post top end, a running light housing top side, and a running light housing sidewall;
   a pair of running lights coupled to the running light housing, the pair of running lights including a red running light coupled to the running light housing sidewall and a green running light coupled adjacent the red running light, the pair of running lights having a plurality of connection leads, the plurality of connection leads being configured to be in operational communication with the boat;
   a light housing coupled to the post, the light housing being coupled to the post sidewall;
   a navigational light coupled within the light housing, the navigational light being in operational communication with the pair of running lights; and
   a power switch coupled to the running light housing, the power switch being in operational communication with the navigational light.

2. The marine front light apparatus of claim 1 further comprising an attachment collar coupled to the post, the attachment collar being coupled to the post sidewall and being selectively engageable with the running light mount.

3. The marine front light apparatus of claim 1 further comprising the attachment collar being flared.

4. The marine front light apparatus of claim 1 further comprising the running light housing being cylindrical.

5. The marine front light apparatus of claim 4 further comprising the pair of running lights extending 180° around the running light housing sidewall.

6. The marine front light apparatus of claim 1 further comprising the power switch being coupled to the running light housing top side.

7. The marine front light apparatus of claim 1 further comprising the light housing extending directly from the post sidewall and having a rectangular frame portion.

8. The marine front light apparatus of claim 7 further comprising the rectangular frame portion being vertically oriented.

9. A marine front light apparatus comprising:
   a post having a post top end, a post bottom end, and a post sidewall, the post being configured to be selectively engageable with a running light mount of a boat;
   an attachment collar coupled to the post, the attachment collar being coupled to the post sidewall and being selectively engageable with the running light mount, the attachment collar being flared;
   a running light housing coupled to the post, the running light housing having a running light housing bottom side coupled to the post top end, a running light housing top side, and a running light housing sidewall, the running light housing being cylindrical;
   a pair of running lights coupled to the running light housing, the pair of running lights including a red running light coupled to the running light housing sidewall and a green running light coupled adjacent the red running light, the pair of running lights extending 180° around the running light housing sidewall, the pair of running lights having a plurality of connection leads, the plurality of connection leads being configured to be in operational communication with the boat;

a light housing coupled to the post, the light housing being coupled to the post sidewall, the light housing extending directly from the post sidewall and having a rectangular frame portion, the rectangular frame portion being vertically oriented;

a navigational light coupled within the light housing, the navigational light being in operational communication with the pair of running lights; and a power switch coupled to the running light housing, the power switch being coupled to the running light housing top side, the power switch being in operational communication with the navigational light.

10. The marine front light apparatus of claim 1 further comprising the light housing having a bracket portion coupled to the post sidewall and a head portion coupled to the bracket portion.

11. The marine front light apparatus of claim 10 further comprising the head portion being pivotably coupled to the bracket portion.

12. The marine front light apparatus of claim 10 further comprising the head portion being rectangular and oriented horizontally.

13. The marine front light apparatus of claim 12 further comprising the head portion having a rounded head back side to accommodate a larger navigational light.

14. A marine front light apparatus comprising:

a post having a post top end, a post bottom end, and a post sidewall, the post being configured to be selectively engageable with a running light mount of a boat;

an attachment collar coupled to the post, the attachment collar being coupled to the post sidewall and being selectively engageable with the running light mount, the attachment collar being flared;

a running light housing coupled to the post, the running light housing having a running light housing bottom side coupled to the post top end, a running light housing top side, and a running light housing sidewall, the running light housing being cylindrical;

a pair of running lights coupled to the running light housing, the pair of running lights including a red running light coupled to the running light housing sidewall and a green running light coupled adjacent the red running light, the pair of running lights extending 180° around the running light housing sidewall, the pair of running lights having a plurality of connection leads, the plurality of connection leads being configured to be in operational communication with the boat;

a light housing coupled to the post, the light housing being coupled to the post sidewall, the light housing having a bracket portion coupled to the post sidewall and a head portion coupled to the bracket portion, the head portion being rectangular and oriented horizontally;

a navigational light coupled within the light housing, the navigational light being in operational communication with the pair of running lights, the head portion of the light housing may have a rounded head back side to accommodate a larger navigational light; and a power switch coupled to the running light housing, the power switch being coupled to the running light housing top side, the power switch being in operational communication with the navigational light.

\* \* \* \* \*